United States Patent Office 2,909,481
Patented Oct. 20, 1959

2,909,481

PROCESS OF REFORMING GASOLINE WITH A PLATINUM-ON-ALUMINA CATALYST AND METHOD OF PREPARING SAID CATALYST COMPOSITE

Carl D. Keith, Munster, Ind., assignor to Engelhard Industries, Inc., a corporation of New Jersey No Drawing. Application August 13, 1956
Serial No. 603,822

9 Claims. (Cl. 208—138)

This invention relates to novel platinum-alumina reforming catalysts and to a method for their preparation. The catalysts have materially advantageous properties, particularly when employed in a cyclic processing-regeneration reforming system.

It has been proposed to reform petroleum naphtha fractions of gasoline boiling range to obtain a liquid product of enhanced octane number. In one method the hydrocarbon feed stock is contacted in the presence of a free hydrogen-containing gas with an alumina based catalyst containing platinum and in the process the conditions are such that there is a net production of hydrogen. During the reforming operation reactions such as dehydrogenation, isomerization, dehydrocyclization and hydrocracking are effected. The platinum-alumina catalyst in the system contains a relatively small amount of platinum and the performance of the catalyst is sensitive to variations in its composition as well as its method of preparation. Due to the high cost of platinum, it is highly desirable to obtain catalysts of improved properties as a means of decreasing costs in commercial processing units employing thousands of pounds of catalyst.

As the demand for fuel of higher and higher octane number goes on, it becomes increasingly necessary for the refiner to produce reformate of at least about 90 research octane number (clear) and he may even be called upon to provide a liquid product of at least about 95 research octane number (clear). As the octane numbers climb the reforming processing conditions become more severe and in general carbon lay-down on the catalyst increases. Even though the platinum catalysts are generally known to be usable continuously for months in fixed bed operations, they eventually become fouled with carbon so that a reformate of required octane cannot be produced, at least not in economic yield. At this point in the operation the catalyst must be regenerated or exchanged for fresh catalyst. As the severity of reforming and the coke lay-down rate increase, it is necessary that the catalyst be regenerated if the process be most economically attractive, and as severity increases regenerations are required more often. As a result, processing down-time increases and the loss of production to the refiner during such periods is a severe economic burden. Accordingly, it is highly desirable to provide a catalyst which makes possible a decrease in the coke make as a means of reducing regeneration time in a cyclic processing-regeneration system.

In the present invention I have developed a method for manufacturing platinum-alumina catalysts which provides a product of materially improved properties with respect to carbon lay-down. My method involves the addition of the platinum component of the catalyst to the alumina base by employing in sequence two distinct impregnation procedures. Thus a portion of the platinum is added by precipitation through reaction in an aqueous medium of a halogenated platinum acid and hydrogen sulfide in the presence of the alumina in hydrate form. Another portion of the platinum is incorporated by mixing an aqueous platinum sulfide sol with the alumina hydrate. By using these methods of platinum addition the resulting catalysts have enhanced properties particularly with respect to decreasing the carbon lay-down during the reforming operation.

My method can perhaps be best understood by referring to the following specific example which is not to be considered as limiting the scope of the invention.

I prepared a composite of two batches of alumina hydrate. In each preparation a solution containing 1 part of ammonium hydroxide to 1 part by weight of deionized water was added with vigorous stirring to an aluminum chloride hexahydrate aqueous solution until the pH was 8.0. The aluminum chloride solution contained 1 pound of Mallinckrodt A.R. grade of the hexahydrate and 2 liters of deionized water. The resulting hydrate was filtered from the mother liquor in a plate and frame press and washed in the press for approximately 16 hours with deionized water at 70 to 80° F. The filter cake was re-slurried in deionized water (approximately 5 gallons of water per pound of $Al_2O_3$) and the pH was adjusted to 9.0 by adding dilute ammonium hydroxide. The hydrate was filtered from the slurry and again washed in the press with deionized water for approximately 16 hours. This reslurrying and water washing procedure was repeated and at the end of this washing period the chloride content ($Al_2O_3$ basis) was less than 0.06 weight percent. The two separate batches of hydrate filter cake were aged at room temperature and then combined to give a mixture containing 84% alumina trihydrates (average analysis) with the remainder being substantially an amorphous hydrous material or a form which upon drying at 110° C. was identified as boehmite.

1,550 grams of the composite alumina hydrate which contained 150 grams of $Al_2O_3$ on a dry basis, were mixed in a four-liter beaker with 450 mls. of deionized water and the mixture was stirred vigorously to effect thorough dispersion. With continued stirring 72.2 mls. of chloroplatinic acid solution, equivalent to 0.525 gram of platinum, were added over a 3-minute period. After 10 minutes of additional stirring 122 mls. of distilled water saturated with hydrogen sulfide at 78° F. were slowly added. Stirring was then continued for 15 minutes.

During the final 15-minute stirring period in the above platinum incorporation procedure, a platinum sulfide sol was prepared. In this preparation 47.7 mls. of chloroplatinic acid solution, equivalent to 0.375 gram of platinum, was mixed with 87 mls. of distilled water which had been saturated with hydrogen sulfide at 78° F. This mixture, in a 200 ml. stoppered bottle, was allowed to stand for 15 minutes. While continuing to stir the slurry of alumina hydrate containing the previously added platinum component, the platinum sulfide sol was added over a ½-minute period. Stirring was continued for 15 minutes. The slurry was then poured into a Pyrex tray and placed in an Aminco forced air oven maintained at 250° F. The tray remained in the oven until the contents were dry and the resulting material was ground to pass 20 mesh, mixed with 2 weight percent Sterotex and formed as ⁵⁄₃₂″ tablets. The Sterotex was burned out of the tablets at 900 to 945° F. using a flowing atmosphere containing 5 parts by volume of air and 300 parts by volume of nitrogen. This temperature and flowing atmosphere were maintained for about 6 hours and finally the catalyst was calcined in air for 3 hours at 900° F. The resulting catalyst analyzed 2.8 weight percent volatile matter and 0.64 weight percent platinum. A portion of the catalyst was ground and screened to obtain a 12 to 20 mesh fraction for evaluation in a reforming processing test unit. Hereinafter, this product will be referred to as catalyst A.

Another catalyst was prepared employing a conventional procedure for platinum incorporation. In this method the entire platinum component was deposited on the alumina base by addition of an aqueous hydrogen sulfide solution to a slurry containing chloroplatinic acid and the alumina hydrate. The alumina hydrate contained about 84 weight percent trihydrate and was tabletted and calcined similarly to the preparation described above. The resulting catalyst analyzed 1.8 weight percent volatile matter and 0.6 weight percent platinum. A portion of this catalyst was ground and screened to obtain a 12 to 20 mesh fraction for evaluation in a reforming processing test unit. Hereinafter, this product will be referred to as catalyst B.

In multiple regeneration aging tests employing catalysts A and B, respectively, their characteristics concerning carbon lay-down were established and catalyst A was a material improvement over catalyst B in this respect. In these tests the feed was a straight run Mid-Continent naphtha typically of a boiling range approximating 235 to 370° F. and a research octane number (neat) of 39. The pressure was 200 pounds, the weight hourly space velocity (WHSV) was 3, and the recycle hydrogen-containing gas to feed molar ratio was 10:1. In testing catalyst A the processing temperature was 925° F. while a temperature of 940° F. was employed in operating with catalyst B. The initial octane number of the liquid products in both tests was about 100 RON (Neat). During the procedure catalyst A processed the hydrocarbon feed for 50 hours before each regeneration or carbon burnoff period, while the reforming periods employing catalyst B were for 48 hours. Thus in twelve processing cycles catalyst A was on stream for 600 hours and catalyst B was on stream for 576 hours. Both catalysts were regenerated under similar conditions after each processing period. Each regeneration was continued until the catalysts were substantially free of carbon. During each regeneration the feed was cut-out and the system purged with nitrogen at atmospheric pressure. The temperature was 800° F. and air was added to the nitrogen at concentrations so that the maximum regeneration temperature was about 825° F. At the end of the burning the gas stream supplied was straight air and the temperature was 800° F.

The data pertaining to carbon lay-down during the tests described above are set forth in Table I.

Table I

| Processing Cycle: | Weight Percent Carbon-On-Catalyst | |
|---|---|---|
| | Catalyst A | Catalyst B |
| 1 | 0.56 | 5.9 |
| 2 | 0.56 | 2.5 |
| 3 | 0.56 | 2.1 |
| 4 | 0.42 | 1.4 |
| 5 | 0.28 | 3.1 |
| 6 | 0.84 | 3.2 |
| 7 | 0.56 | 2.5 |
| 8 | 3.40 | 1.8 |
| 9 | 1.3 | 4.2 |
| 10 | 0.42 | 2.3 |
| 11 | 0.29 | 2.0 |
| 12 | 0.29 | 1.0 |
| Total carbon | 9.48 | 32.0 |

Thus the carbon make with catalyst A was less than one-third that of catalyst B. This advantage for catalyst A is directly transferable to an economic gain in a cyclic processing-regeneration method employing a plurality of cycles as the down-time required for carbon removal is markedly decreased.

Thus my catalysts are provided by incorporating a portion of the platinum component through reaction of a halogen platinum acid, for instance fluoro-, chloro-, bromo- or iodo-platinic acid, and hydrogen sulfide in an aqueous slurry of alumina hydrate. The latter is the precurser for the base of the final catalyst which of course comprises the majority of the catalyst. The hydrogen sulfide can be employed as a gas or an aqueous solution. Another portion of the platinum component is provided by mixing an aqueous platinum sulfide sol with the alumina hydrate. This sol can be provided by reaction in an aqueous medium of a halogen platinic acid with hydrogen sulfide. It is desirable not to let the sol sit too long before it is mixed with the alumina hydrate; otherwise the platinum component of the former may flocculate and lose its sol form. Flocculation should not be allowed to proceed to the point that a predominant portion of the platinum component is not dispersible to the finely divided form desired for combination with the alumina hydrate. In my method the separate portions of platinum can be incorporated in the alumina base precursor in any desired order. The platinum usually comprises between about 0.2 to 1.5% or more of the final catalyst with at least about 0.1% being incorporated in each of the designated procedures for platinum addition. Generally, the platinum is in finely divided form which is not detectable by X-ray diffraction methods which indicate that if crystals are present their sizes are less than about 50 Angstrom units. The sol method of addition has in instances deposited platinum masses which appear to be larger than 50 Angstroms.

My alumina hydrate catalyst base precursor is advantageously comprised essentially of about 65 to 95% of trihydrate and about 5 to 35% of amorphous hydrous alumina or monohydrate, e.g. boehmite, or their mixture. Methods for preparing this hydrate are discussed in the copending applications of Teter, Gring and Keith, Serial No. 288,058, filed May 15, 1952, and Serial No. 489,726, filed February 21, 1955. The separate types of hydrous aluminas are identified by X-ray diffraction techniques on samples dried at 110° to 120° C. The alumina hydrate can be prepared, for instance, by reacting a strong acid aluminum salt with a base such as ammonium hydroxide. In this system the initial alumina hydrate obtained can be aged in a basic aqueous medium to provide hydrate phases predominating in the trihydrate. Sodium aluminate and other materials containing aluminum can also be employed as a hydrate source.

After addition of the platinum components to the catalyst base precursor the impregnated hydrate is dried and calcined. Drying takes away free water while calcination removes water of crystallization and converts the hydrate to gamma-alumina modifications. In general, drying is conducted at temperatures ranging from about 225 to 500° F., while calcination is completed at temperatures ranging from about 800 to 1300° F. or more. During drying and calcination the catalyst can be contacted with a flowing gas stream such as air, nitrogen, etc. When desired the catalyst can be formed into macro-size particles as by tableting or extruding. The formed particles are generally about $\frac{1}{16}$ to $\frac{1}{4}''$ in diameter and about $\frac{1}{16}$ to 1'' or more in length. Tableting or extruding is generally done after drying and before calcination but other operational sequences can be employed. Also the catalyst can be used in finely divided form. Before use the catalyst is usually reduced by contact with a free-hydrogen containing gas at elevated temperature, for instance about 500 to 1000° F., but this might be done through contact with the hydrogen present in the reforming operation.

In the reforming of gasoline boiling range hydrocarbons my catalyst can be employed under the usual processing conditions, for instance 800 to 1000° F., 100 to 750 p.s.i., 1 to 10 WHSV, and 2 to 20 moles of hydrogen per mole of hydrocarbon. The hydrogen can be supplied to the reaction zone by recycling hydrogen-rich tail gases. The catalyst can be employed as a fixed or moving bed or in a fluidized system. Most often the system is comprised of a plurality of adiabatic reactors with a fixed catalyst bed in each reactor and a feed heater before each reactor. The liquid product can be separated from the reaction effluent as in an atmospheric pressure flash drum. Preferably, the conditions of reforming are selected to provide a liquid product of at least about 90 of 95 research octane number (neat).

When the processing cycle has continued for a time so that the liquid product of desired octane number can no longer be made at feasible temperatures and economically sound yields, the catalyst can be regenerated through removal of a substantial portion of the carbonaceous material deposited during processing. In general, this result can be accomplished through contact with an oxygen-containing gas at temperatures in the range from about 800 to 1000° F. In the regenerating step the oxygen content of the combustion supporting gases can be limited if necessary to avoid excessive temperatures, but if temperature limitations permit I prefer to employ air during the last part of the regeneration period. After regeneration and reduction by contact with free hydrogen the catalyst is again employed for processing in the reforming operation. This processing regenerating cycle can be repeated until the catalyst when regenerated will no longer meet the requirements of a given situation as to octane-yield relationships of the liquid product.

I claim:

1. In a method for producing a platinum-alumina catalyst consisting essentially of an alumina base and about 0.2 to 1.5% platinum, the steps comprising incorporating a portion of the platinum component on the alumina base by reaction in an aqueous medium of a halogen platinic acid with hydrogen sulfide in the presence of an alumina hydrate catalyst base precursor, incorporating a portion of the platinum component on the alumina base by mixing the alumina hydrate precursor with an aqueous platinum sulfide sol, and drying and calcining the resulting platinum-containing alumina hydrate catalyst precursor, said amount of platinum added in each of said portions of platinum being at least about 0.1% based on the final composition.

2. The method of claim 1 in which the alumina hydrate contains about 65 to 95 weight percent of trihydrate.

3. In a method for producing a platinum-alumina catalyst consisting essentially of an alumina base and about 0.2 to 1.5% platinum, the steps comprising incorporating a first portion of the platinum component on the alumina base by reaction in an aqueous medium of chloroplatinic acid with hydrogen sulfide in the presence of an alumina hydrate base precursor containing about 65 to 95% of trihydrate, incorporating a second portion of the platinum component on the alumina base by mixing the alumina hydrate precursor containing said first portion of platinum with an aqueous platinum sulfide sol, and drying and calcining the resulting platinum-containing alumina hydrate catalyst precursor, said amount of platinum added in each of said first and second portions of platinum being at least about 0.1% based on the final composition.

4. The catalyst produced by the method of claim 1.

5. In the reforming of gasoline boiling range hydrocarbons, the step comprising contacting the hydrocarbon with a platinum alumina reforming catalyst at about 800 to 1000° F., about 100 to 750 p.s.i., about 1 to 10 WHSV, and about 2 to 20 moles of hydrogen per mole of hydrocarbon, said catalyst being that of claim 4.

6. The catalyst produced by the method of claim 2.

7. In the reforming of gasoline boiling range hydrocarbons, the step comprising contacting the hydrocarbon with a platinum alumina reforming catalyst at about 800 to 1000° F., about 100 to 750 p.s.i., about 1 to 10 WHSV, and about 2 to 20 moles of hydrogen per mole of hydrocarbon, said catalyst being that of claim 6.

8. The catalyst produced by the method of claim 3.

9. In the reforming of gasoline boiling range hydrocarbons, the step comprising contacting the hydrocarbon with a platinum alumina reforming catalyst at about 800 to 1000° F., about 100 to 750 p.s.i., about 1 to 10 WHSV, and about 2 to 20 moles of hydrogen per mole of hydrocarbon, said catalyst being that of claim 8.

References Cited in the file of this patent

UNITED STATES PATENTS

| | | |
|---|---|---|
| 2,611,749 | Haensel | Sept. 23, 1952 |
| 2,658,028 | Haensel et al. | Nov. 3, 1953 |